US008630320B2

(12) United States Patent
Munroe et al.

(10) Patent No.: US 8,630,320 B2
(45) Date of Patent: Jan. 14, 2014

(54) METHOD AND APPARATUS FOR A HYBRID MODE-LOCKED FIBER LASER

(75) Inventors: Michael J. Munroe, Eugene, OR (US); David A. Dutton, Corvallis, OR (US); Joseph G. LaChapelle, Philomath, OR (US)

(73) Assignee: Deep Photonics Corporation, Corvallis, OR (US)

( * ) Notice: Subject to any disclaimer, the term of this patent is extended or adjusted under 35 U.S.C. 154(b) by 1139 days.

(21) Appl. No.: 12/202,002

(22) Filed: Aug. 29, 2008

(65) Prior Publication Data
US 2009/0107962 A1    Apr. 30, 2009

Related U.S. Application Data

(60) Provisional application No. 60/969,182, filed on Aug. 31, 2007.

(51) Int. Cl.
*H01S 3/30*    (2006.01)
*H01S 3/10*    (2006.01)

(52) U.S. Cl.
USPC ............................................... 372/6; 372/25

(58) Field of Classification Search
USPC .......................................... 372/6, 18, 25, 26
See application file for complete search history.

(56) References Cited

U.S. PATENT DOCUMENTS

| 5,450,427 | A | * | 9/1995 | Fermann et al. | 372/10 |
| 6,014,249 | A | | 1/2000 | Fermann et al. | |
| 6,275,512 | B1 | | 8/2001 | Fermann | |
| 6,347,007 | B1 | | 2/2002 | Grubb et al. | |
| 2005/0190802 | A1 | * | 9/2005 | Richardson et al. | 372/25 |
| 2009/0201954 | A1 | * | 8/2009 | Alekel et al. | 372/6 |
| 2011/0128613 | A1 | * | 6/2011 | Alekel et al. | 359/328 |

OTHER PUBLICATIONS

Bado et al., "Nd:YLF mode-locked oscillator and regenerative amplifier," Optics Letters, vol. 12, No. 5 (May 1987), pp. 319-321.
Jeong et al., "Single-mode plane-polarized ytterbium-doped large-core fiber laser with 633-W continuous-wave output power," Optics Letters, vol. 30, No. 9 (May 2005), pp. 955-957.
Laming, "High-power erbium-doped fiber amplifiers operating in the saturated regime," IEEE Phton. Technol. Lett, vol. 3, No. 3, (Mar. 1991), pp. 253-255.

* cited by examiner

*Primary Examiner* — Armando Rodriguez
(74) *Attorney, Agent, or Firm* — Kilpatrick Townsend & Stockton LLP

(57) ABSTRACT

An apparatus for producing coherent pulsed light with a fiber-based master oscillator/fiber amplifier architecture includes a fiber-coupled mode-locked laser source. The fiber-coupled mode-locked laser source is configured to provide pulses having a pulse duration of less than 1 ns. The apparatus also includes a fiber-coupled amplitude modulator optically coupled to the fiber-coupled mode-locked laser source. The fiber-coupled amplitude modulator is capable of gate durations greater than 1 ns. The apparatus further includes a saturated fiber power amplifier optically coupled to the fiber-coupled amplitude modulator.

19 Claims, 3 Drawing Sheets

METHOD AND APPARATUS FOR A HYBRID MODE-LOCKED FIBER LASER

CROSS-REFERENCES TO RELATED APPLICATIONS

The present application claims benefit under 35 U.S.C. §119(e) of U.S. Provisional Patent Application No. 60/969,182, filed on Aug. 31, 2007, entitled "Method and Apparatus for a Hybrid Mode-Locked Fiber Laser," the disclosure of which is hereby incorporated by reference in its entirety for all purposes.

BACKGROUND OF THE INVENTION

The present invention relates generally to laser systems. In particular, an embodiment relates to a fiber laser-based apparatus and a method of operating the same to produce very high peak power, near-infrared, sub-nanosecond laser pulses by passing gated mode-locked pulses through a heavily-saturated fiber amplifier. For example, an embodiment provides fiber laser emission characteristics that are uniquely appropriate for applications that include inspection, illumination, and/or micro-machining. Other embodiments are useful in other applications as well.

Fiber lasers have advanced to become economical and efficient high power infrared laser sources. Average optical output powers of tens of kilowatts are currently available in commercial fiber laser systems. FIG. 1 is a schematic diagram of a conventional fiber laser system with a master oscillator, fiber amplifier (MOFA) architecture. The master oscillator (also known as a seed laser) emits a low power optical signal that is coupled into the amplifier section through an optical isolator. The optical isolator protects the master oscillator from any light counter propagating back through the amplifier section. The amplifier section consists of a length of gain fiber that is pumped by one or more pump lasers (typically diode lasers) through a pump coupler. The gain fiber may be multi- or single spatial mode, polarization random or maintaining, cladding pumped or core pumped, and may have a variety of dopants (for example Yb, Er, Nd, Pr, etc.) depending on the emission and pumping wavelengths. The pump laser light is absorbed by the dopants in the gain fiber, raising the dopants into an excited state. The emission from the master oscillator is amplified through stimulated emission as it interacts with the excited dopants implanted in the fiber core.

An often used source for short pulse durations (<1 ns) is a mode-locked laser, where the pulse repetition rate of a mode-locked laser is fixed and has a single longitudinal gain mode. In order to decrease the repetition rate, pulse selection has been used in the past. Pulse selection requires a "pulse-picking" apparatus (amplitude modulator, acousto-optic deflector, etc.) that is precisely synchronized with the master oscillator pulse train using a phase-locked loop. In this way, the repetition rate may be changed to any sub-harmonic of the starting repetition rate. While this method is functional, the precise synchronization and requirement for a short selection window (less than one pulse period) are complex and difficult to achieve.

Many variants of the above design are used, including but not limited to the use of multiple gain stages with multiple pumps, the inclusion of various filtering elements, a delivery fiber at the output of the laser, and forward and/or backward propagating pumps. Fiber lasers can operate with a wide range of output parameters to satisfy the varying constraints of an application. It is the specifications of the individual fiber amplifier subsystems that determine the output emission. The output emission of a fiber laser can be specified with the average output optical power, peak output optical power, temporal pulse width, center optical wavelength, polarization, spatial mode, and spectral bandwidth. Pumping limitations, gain limitations, optical damage to components, and nonlinear impairments require a unique system design of the elemental blocks of a fiber laser to achieve the desired set of output parameters.

Fiber lasers are of particular interest as an efficient and compact pulsed source for nonlinear frequency conversion from near infrared (NIR) to visible wavelengths. Nonlinear frequency conversion requires high peak power, narrow optical bandwidth, linear polarization, and single spatial mode. However, it has not yet been practical to simultaneously satisfy these requirements in a pulsed fiber lasers due to nonlinear impairments. In particular Stimulated Brillouin Scattering (SBS), Stimulated Raman Scattering (SRS), and Self Phase Modulation (SPM) limit the performance of fiber lasers. These nonlinear impairments increase with higher peak intensity in the fiber, with narrower spectral bandwidth, and by propagating linear polarized light. Examples of mode-locked fiber lasers are known in the art that reduce nonlinear impairments because of the large natural bandwidth of the femtosecond (fs) pulses they create, as well as nanosecond (ns) pulsed fiber lasers that use a master oscillator with artificially high optical bandwidth to reduce nonlinearities. Similarly, fiber lasers with kilowatt (kW) average power are known in the art. These lasers function in continuous wave operation, and generally do not approach the 20-500 kW peak powers appropriate for some applications.

Thus, there is a need in the art for improved methods and systems related to high power mode-locked fiber lasers.

SUMMARY OF THE INVENTION

This invention relates generally to high performance pulsed laser sources that operate with high peak power, sub-nanosecond pulse widths, adjustable pulsing characteristics, and optical frequency converters.

In particular, an embodiment relates to a fiber laser-based apparatus and a method of operating the same to produce very high peak power, near-infrared, sub-nanosecond laser pulses by passing gated mode-locked pulses through a heavily-saturated fiber amplifier. Thus, embodiments operate with user-determined pulse envelope repetition rates and durations. Also, peak power can be modified as the repetition rate is changed without altering the average power. Because the fiber laser output can be made to satisfy conditions for nonlinear optical frequency conversion (e.g. single mode, polarized, and narrow spectral linewidth), the lasers provided by various embodiments are well suited to produce visible and ultraviolet laser light. The agile nature of the fiber laser emission characteristics is uniquely appropriate for applications that include inspection, illumination, and micro-machining. Other embodiments are useful in other applications as well.

Embodiments of the present invention described herein include a method and fiber laser-based apparatus for producing very high peak power, near-infrared, sub-nanosecond laser pulses by passing gated mode-locked pulses through a heavily-saturated fiber amplifier. Thus, embodiments of the present invention provide a fiber laser that is able to deliver pulse packet energies on a time duration scale greater than 1 ns but comprised of a multitude of sub-nanosecond laser pulses within a temporal packet envelope. As such, the invention has the capability to operate with varied pulse packet time durations and with user-determined pulse frequencies of up to 50 MHz. Also, peak power can be modified as the repetition rate is changed without altering the average power due to the saturation of the power amplifier stage. The agile nature of the fiber laser emission as described herein is unique among high power laser systems with its ability to control and program laser packet energies of an envelope comprised of sub-nanosecond laser pulses. The applications for this light source include inspection, illumination, and micro-machining with optional frequency conversion stages for light generation of visible and ultraviolet radiation.

According to an embodiment of the present invention, an apparatus for producing coherent pulsed light with a fiber-based master oscillator/fiber amplifier architecture is provided. The apparatus includes a fiber-coupled mode-locked laser source configured to provide pulses having a pulse duration of less than 1 ns. The apparatus also includes a fiber-coupled amplitude modulator optically coupled to the fiber-coupled mode-locked laser source. The fiber-coupled amplitude modulator is capable of gate durations greater than 1 ns. The apparatus further includes a saturated fiber power amplifier optically coupled to the fiber-coupled amplitude modulator.

According to a specific embodiment of the present invention, a method of providing a set of amplified optical pulse packets is provided. The method includes providing a train of optical pulses. Each of the optical pulses is characterized by a pulse width of less than 1 ns. The method also includes gating the train of optical pulses to provide a set of optical pulse packets having a first average power. Each of the optical pulse packets is characterized by a time duration of greater than 1 ns and includes more than one optical pulse. The method further includes amplifying the set of optical pulse packets to provide the set of amplified optical pulse packets having a second average power. The second average power is substantially independent of the first average power.

Numerous benefits are achieved using the present invention over conventional techniques. For example, an embodiment according to the present invention provides a laser apparatus that operates with user-determined pulse envelope repetition rates and durations. Additionally, in some embodiments, the peak power can be modified as the repetition rate is changed without altering the average power. Moreover, embodiments of the present invention provide lasers that are well suited to produce visible and ultraviolet laser light using frequency conversion techniques. Depending upon the embodiment, one or more of these benefits may exist. These and other benefits have been described throughout the present specification and more particularly below.

DETAILED DESCRIPTION OF SPECIFIC EMBODIMENTS

Figure 1:
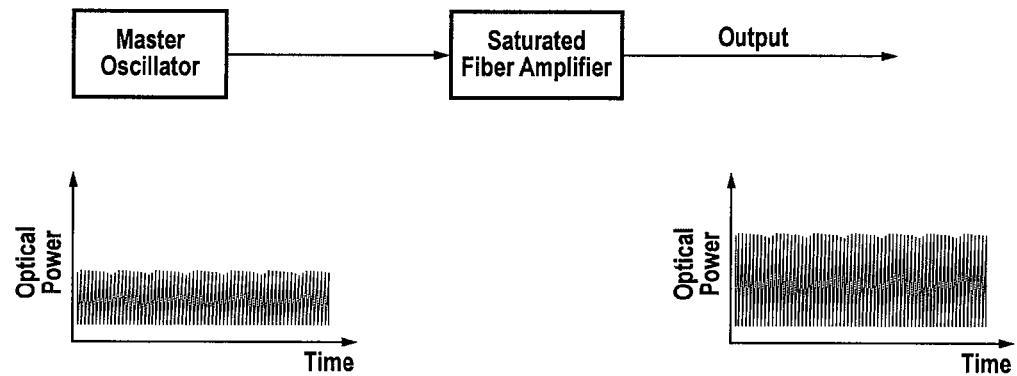
FIG. 1 is a schematic diagram of a conventional fiber laser with a master-oscillator, power amplifier architecture.

Without limiting embodiments of the present invention, the following glossary is provided in relation to the description herein.

Deep ultraviolet (DUV): A portion of the electromagnetic spectrum with wavelengths in the range of 100-315 nm.

Diode Laser: refers to a light-emitting diode designed to use stimulated emission to generate a coherent light output. Diode lasers are also known as laser diodes or semiconductor lasers.

Diode-Pumped Laser: refers to a laser having a gain medium that is pumped by a diode laser.

Double-clad fiber: An optical fiber that contains a core region that guides a first light signal, surrounded by a first cladding region that contains the first light signal within the core. The first cladding region also guides a second light signal. The first cladding region is surrounded by a second cladding region that contains the second light signal in the first cladding region.

Fiber Laser: A laser may be constructed using an optical fiber as the gain medium and pumped with optical energy. Fibers are typically glass-type materials, though may be crystalline or glass-nano-crystal composites.

Harmonic Generation: With relation to radiant energy, the conversion of electromagnetic radiation having a given frequency into radiation having a multiple of the frequency. This can occur when an intense directional light beam passes through a nonlinear optical medium.

Hybrid Mode-Locked: An apparatus and method whereby a series of mode-locked laser temporal pulses are gated by an amplitude modulator device so as to create an envelope of said laser pulses having a gate period longer than twice the duration of the mode-locked temporal pulse widths, controlled by the modulator.

Infrared Radiation: refers to electromagnetic radiation characterized by a wavelength between about 700 nm and about 5000 nm.

Large Mode Area Fiber: A fiber with a mode area larger than that of typical single mode step index fiber. The fibers typically support the propagation of a single to few spatial modes. Several examples of large mode area fibers are photonic crystal fiber, low index step fiber, and gradient index fiber. The larger mode area of these fibers reduces the effects of fiber nonlinearities. Typically the mode areas are greater than 200 $\mu m^2$.

Laser: refers to an acronym for light amplification by stimulated emission of radiation. A laser is a cavity that contains any material—crystal, glass, liquid, dye or gas—where an atom of which are capable of being excited to a metastable electronic state by a pumping energy e.g., by light or an electric discharge. The light emitted by the atom's electron as it returns to its energetic ground state is able to promote stimulated emission of other atoms in the medium. The light (referred to herein as stimulated radiation) is continually increased in intensity as it makes multiple round trips through the cavity.

Light: refers to electromagnetic radiation in a range of frequencies running from infrared through the ultraviolet, nominally corresponding to a range of wavelengths from about 100 nm to about 15 $\mu m$; optical radiation.

Mode: The electromagnetic spatial pattern that forms in an optical cavity when the cavity is optically excited at a frequency that is sufficiently near one of the resonant frequencies of the cavity.

Mode-Locked Laser: refers to a laser that functions by controlling the relative phase (sometimes through modulation with respect to time) of each mode internally to give rise selectively to energy bursts of high peak power and short duration, e.g., in the picosecond domain.

Nonlinear Optic: refers to a class of optical phenomena that can typically be viewed only with nearly monochromatic, directional beams of light, such as those produced by a laser. Harmonic generation (e.g., second-, third-, and fourth-harmonic generation), optical parametric oscillation, sum-frequency generation, difference-frequency generation, optical parametric amplification, and the stimulated Raman effect are examples.

Nonlinear material: refers to materials that possess a non-zero nonlinear dielectric response to optical radiation that can give rise to nonlinear effects. Examples of nonlinear materials include crystals of lithium niobate ($LiNbO_3$), lithium triborate ($LiB_3O_5$ or LBO), beta-barium borate ($\beta$-$BaB_2O_4$ or BBO), cesium lithium borate ($CsLiB_6O_{10}$ or CLBO), yttrium aluminum borate ($YAl_3B_4O_{12}$) and its isomorphs, as well as quasi-phase-matched materials.

Phase-matching: refers to the technique used in a multi-wave nonlinear optical process to enhance the distance over which the coherent transfer of energy between the waves is possible. For example, a three-wave process is said to be phase-matched when $k_1+k_2=k_3$, where $k_i$ is the wave vector of the $i^{th}$ wave participating in the process. In frequency doubling, e.g., the process is most efficient when the fundamental and the second harmonic phase velocities are matched.

Pulse width: refers to the time or duration of the pulse emitted by a pulsed laser, in seconds. Also referred to as pulse length.

Quasi-Phase-matched (QPM) Material: when the fundamental and higher harmonic radiation are not phase-matched, but a QPM grating compensates. In a QPM material, the fundamental and higher harmonic can have identical polarizations, often improving efficiency. Examples of quasi-phase-matched materials include periodically-poled lithium tantalate, periodically-poled lithium niobate (PPLN) or periodically-poled potassium titanyl phosphate (PPKTP).

Repetition rate: The frequency of a running sequence of laser pulses, typically given in Hertz.

Waist: 1) The narrowest point of a nominally Gaussian beam; 2) the Gaussian beam radius at the narrowest point. The Gaussian beam radius is the radius at which the intensity of a nominally Gaussian beam is $1/e^2$ of the central, peak intensity.

According to an embodiment of the present invention, a pulsed NIR fiber laser is provided that uniquely emits coherent radiation with a combination of all the following properties: stable linear polarization, high peak power, pulse durations from 10 ps to 1 ns, narrow spectral bandwidth, predominately one spatial mode, and user-controlled modulation of gated pulse packets of an envelope of mode-locked sub-nanosecond pulses. Embodiments are applicable in the gain window of Yb-doped fiber (1015-1085 nm, such as 1064 nm) or the gain window of Er-doped fiber (1500-1575 nm, such as 1545 nm). Other rare earth dopants are utilized in lasers described herein in other embodiments. One of ordinary skill in the art would recognize many variations, modifications, and alternatives.

A variety of laser components are utilized in the designs described herein to achieve these characteristics, including a master oscillator that generates linearly polarized infrared laser radiation, an amplitude modulator for pulse train gating, a polarization-maintaining optical isolator that attenuates the backward propagating light from the fiber amplifier while transmitting the forward propagating light from the master oscillator, and a fiber power amplifier to intensify the master oscillator emission transmitted through the isolator. The fiber power amplifier includes a polarization-maintaining, large-mode-area, double-clad {Yb—, Er—, Yb:Er—, or the like} doped gain fiber, one or more diode pump lasers typically based upon AlGaAs/GaAs designs that emit light of selected wavelengths from a range 975-985 nm, an optional structure to control the operational temperature control of the diode pump lasers, and an optical coupler to couple the emission from the diode pump lasers into the cladding of the gain fiber.

The master oscillator emits a periodic train of temporally short, low power pulses. In many instances these pulses may have been stretched by applying a linear chirp in order to reduce nonlinearities in the fiber amplifier. This emission is coupled into a saturated fiber amplifier that emits a pulse train with the same temporal shape, but with higher power.

Power amplifiers operate in the highly saturated regime of amplification. This is necessary to achieve good power efficiency in the amplifier, maximizing output average power for a given input pump average power. If the relaxation rate of the amplifier gain (about 100 μs to 2 ms for Yb-doped fiber) is much longer than the pulse period of the master oscillator input signal, the gain cannot dynamically respond to the time variations of the input signal. Consequently, the gain of the amplifier responds as if the input signal is a continuous wave (CW) signal. The average output power of the amplifier is only dependent on the average input power from the master oscillator. In the case of very high saturation, the output power is only weakly dependent on the input average power. In practice, the input average power can be varied by as much as 10 dB with little effect (e.g., <1 dB change) on the output average power. In embodiments of the present invention, an amplifier is considered to be operating in saturation if the output of the amplifier changes less than 1 dB with a change of input power of 3 dB.

This behavior in saturation can be used to increase the output pulse energy by reducing the repetition rate. Since the same amount of average power will be output at a reduced repetition rate, it follows that the pulse energy (and pulse peak power) of the output light increases as the repetition rate decreases.

Figure 2:
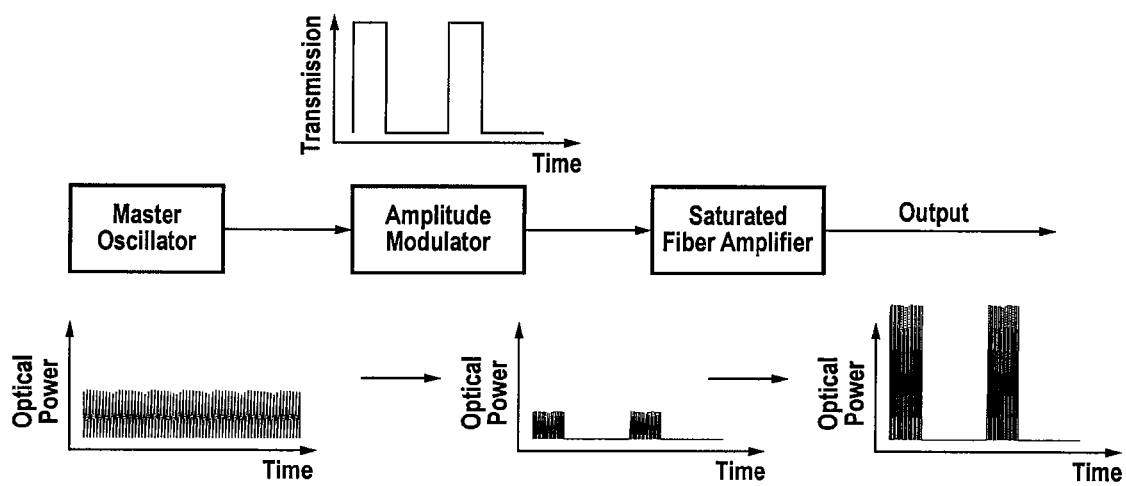
FIG. 2 is a schematic diagram of a fiber laser according to an embodiment of the present invention.

FIG. 2 is a schematic diagram of a fiber laser according to an embodiment of the present invention. Embodiments described herein do not require synchronization (although they may be synchronized) or very fast pulse selection since the pulse packets always contain more than one pulse, thus, the embodiments described herein are described as hybrid mode-locking. The combination of a mode-locked laser source and an amplitude modulator is represented in the schematic of FIG. 2. With the placement of an amplitude modulator between the master oscillator and saturated fiber amplifier, groups or packets of pulses can be deterministically gated. The overall desired effect of gating the mode-locked pulse train is to reduce the repetition rate of pulses directed into the gain-saturated optical amplifier so as to increase the amplified pulse energy and peak power. As opposed to conventional pulsed fiber amplifier technology, an embodiment of the invention amplifies packets of pulses with each packet of pulses saturating the gain of the amplifier and these packets may be asynchronous with the input pulse train.

By way of example, the amplitude modulator gates groups of output pulses with about a 10% duty cycle. The output of the saturated amplifier will still deliver the same average power, but its peak power increases by a factor of 10 as compared to the non-gated laser.

While the gate pulse may be synchronized with the master oscillator pulse train, the need for synchronization quickly diminishes as the number of master oscillator pulses per gate pulse increases. Synchronous gating is defined as the gate pulse having a constant temporal relationship with the master oscillator pulse train, i.e. the rising edge of the gate pulse is always a constant time duration before the next pulse emitted by the master oscillator. In the case of synchronous gating, the number of master oscillator pulses contained in each pulse packet is a constant. This is not the case in asynchronous gating. In asynchronous gating the gate pulse has an arbitrary temporal relationship with respect to the master oscillator pulse train, i.e. the rising edge of the gate pulse is not a constant time duration before the next pulse emitted by the master oscillator. Thus, the number of master oscillator pulses in each packet may vary for asynchronous gating. If the gate pulse is selecting N master oscillator pulses on average, without synchronization the gate pulse will select N+1 as the phases between the gate pulse and master oscillator pulse train drifts. This may cause packet energy fluctuations with relative magnitude 1/N. So if the gate pulse selects more than 100 master oscillator pulses, the relative packet energy fluctuations will be less than a percent. For small number of pulses in each packet synchronous gating may be required. For example, if 10 pulses per packet are required, the relative energy fluctuation resulting from asynchronous gating is 10%.

Note that the gating period must be much smaller than the relaxation time of the fiber gain in order for the amplifier to be in a CW saturated mode. Additionally, it is generally preferable to keep the fiber amplifier saturated for several other reasons. If the input average power over a gain relaxation time is not high enough to saturate the gain the population of gain atoms in the excited state becomes very large. This in turn results in a large increase in unwanted amplified spontaneous emission. Also, photo-darkening damage increases as the excited state population increases.

Similarly, the pulse width may be altered without changing the average power. By changing the pulse width of the master oscillator emission while adjusting the repetition rate of the master oscillator to maintain constant master oscillator average output power, the pulse duration may be varied without significantly changing the average power. Also, peak power can be modified as the repetition rate is changed without altering the average power due to the saturation of the power amplifier stage. The agile nature of the fiber laser emission operational parameters as described by the invention herein is unique among high power laser systems.

The utility of the agile nature of the fiber laser emission can be seen in the application of micro-machining. In a micro-machining application, a predetermined depth of material must be removed from a substrate. The width of the material to be removed is determined by the diameter of the laser beam at the surface of the substrate. In order to photo-ablate, the light pulses must be above a minimum peak power threshold. The peak power of the output laser pulses can be adjusted above this threshold by adjusting the duty cycle (temporal duration of pulse divided by pulse period) of the gating pulse. For example, if the fiber laser emits pulses with peak power $P_0$ when operating at 100% duty cycle (ungated) and the threshold necessary for photo-ablation is $P_{th}$, then the duty cycle of the laser should be set to less than $P_0/P_{th}$. The amount of material removed (the depth of ablation) by each pulse packet is determined by the number of pulses in each packet. The number of pulses in each packet can be changed by adjusting the gate pulse repetition rate while keeping the gate pulse duty cycle constant. Thus, precise adjustment of the ablation depth can be quickly made by adjusting the number of pulses per packet. Also, the peak power may be adjusted during processing by adjusting the gate pulse duty cycle in order to accommodate materials with differing photo-ablation thresholds.

Figure 3:
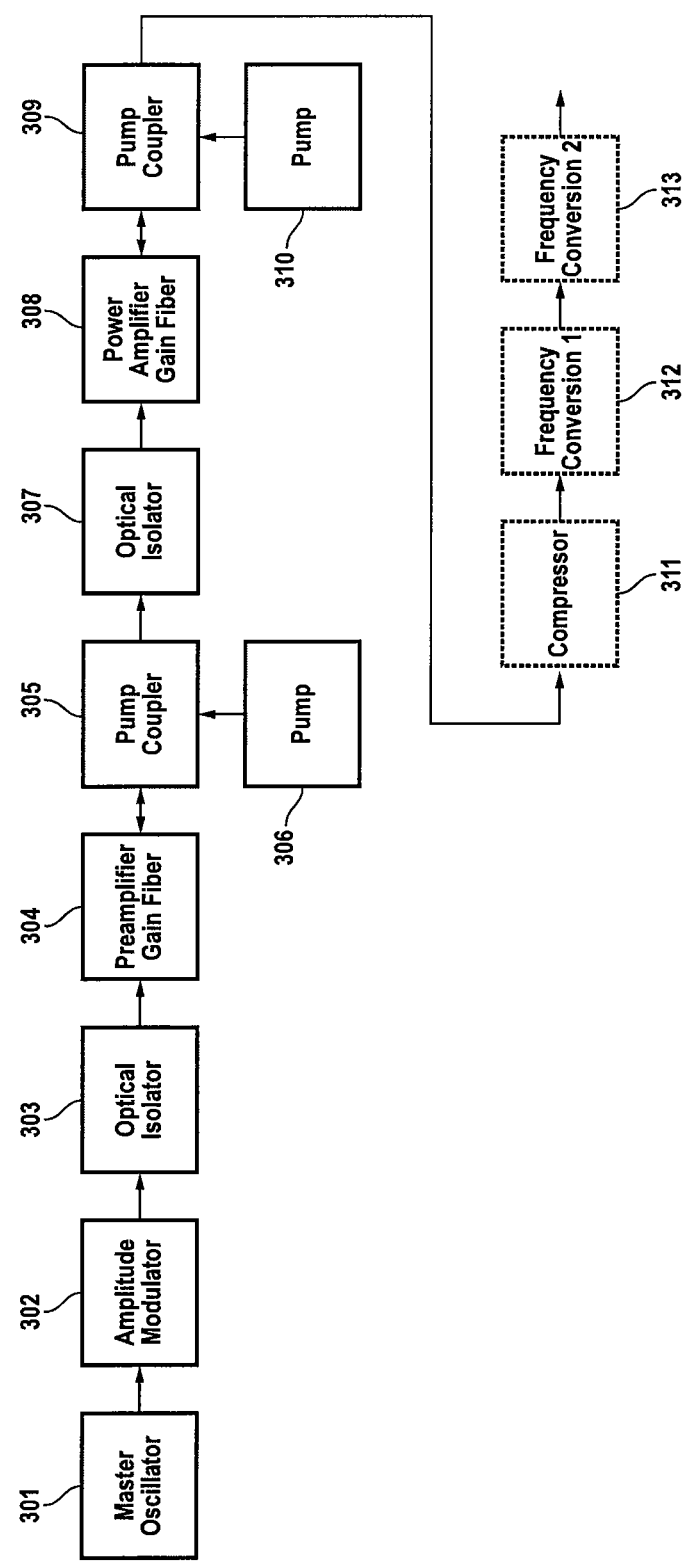
FIG. 3 is a schematic diagram of a hybrid mode-locked UV laser according to an embodiment of the present invention.

FIG. 3 is a schematic diagram of a hybrid mode-locked UV laser according to an embodiment of the present invention. The laser illustrated in FIG. 3 utilizes a frequency conversion system. The system uses chirped pulse amplification of the gated pulse stream from the mode-locked master oscillator. Chirped pulses emitted by the master oscillator are then gated by the amplitude modulator. The gated output is then amplified by a fiber preamplifier and power amplifier. The emission of the power amplifier may be temporally compressed to increase the peak power; additionally, one or more optional stages of nonlinear optical frequency conversion may be added to convert the fundamental wavelength of the hybrid mode-locked laser system.

In the example illustrated in FIG. 3, the emission from the master oscillator is a 100 MHz pulse train of 150 ps duration chirped pulses. The gating pulse decreases the repetition rate by a factor of 10 by gating with a 1 μs window every 10 μs. Approximately 100 pulses are within each gate pulse. The output of the power amplifier has an average power of 20 W with each pulse having a peak power of 14 kW. The light is then compressed by a factor of 15 at an overall efficiency of 80%, resulting in emission with 16 W average power, a 10 ps pulse duration, and a peak power of 168 kW. The compressed pulse train then enters a frequency conversion stage based on non-critical phase-matched lithium triborate that converts the beam to a wavelength of 532 nm with an efficiency of 55%. The resulting 532 nm beam then enters a second frequency conversion stage based on yttrium lanthanum aluminum borate that converts the beam to a wavelength of 266 nm with an efficiency of 25%. The resulting output has an average power of 2.2 W at a wavelength of 266 nm.

It is worthwhile to note that the method described herein has great utility not only to illumination systems, but also micro-machining systems. Laser micro-machining systems traditionally employ pulsed lasers with greater than nanosecond pulse widths. The lasers produce a preprogrammed series of pulses when externally triggered. The hybrid mode locked laser system can function in the same way, but producing triggerable nanosecond envelopes of high-peak-power picosecond pulses. In this one method, the advantage of high frequency conversion efficiency of picosecond pulses may be utilized in micro-machining applications as well as illumination applications.

Many other embodiments of the present invention will be evident to one of ordinary skill in the art. These may include, but are not limited to, three stages of frequency conversion to generate the fifth harmonic (213 nm) from the 1064 nm emission of a ytterbium gain medium, the use of erbium or erbium/ytterbium doping in the gain fiber to generate a fundamental wavelength in the 1550 nm and thus produce its harmonics, and the intentional variation of gating pulse width for applications in laser micro-machining. One of ordinary skill in the art would recognize many variations, modifications, and alternatives.

Figure 4:
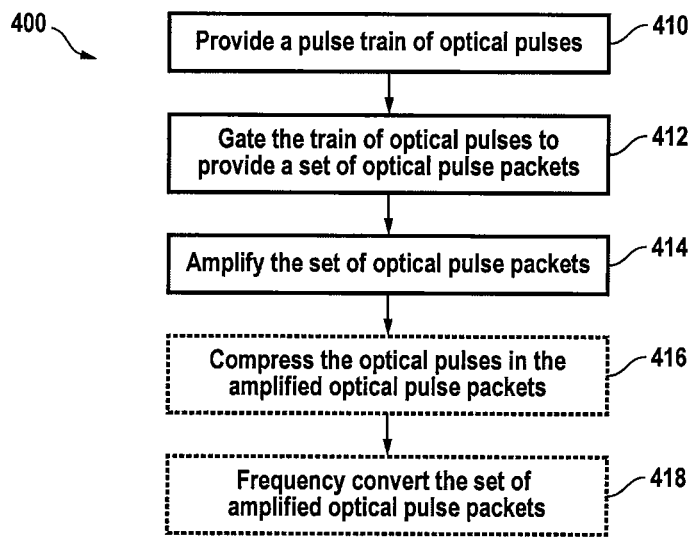
FIG. 4 is a simplified flowchart illustrating a method of operating a hybrid mode-locked laser according to an embodiment of the present invention.

FIG. 4 is a simplified flowchart illustrating a method of operating a hybrid mode-locked laser according to an embodiment of the present invention. The method 400 of providing a set of amplified optical pulse packets includes providing a train of optical pulses (410). Each of the optical pulses in the train is characterized by a pulse width of less than 1 ns. In an embodiment, providing the train of optical pulses includes the use of a fiber-coupled mode-locked laser source comprises a rare earth doped active fiber.

The method also includes gating the train of optical pulses to provide a set of optical pulse packets having a first average power (412). Each of the optical pulse packets is characterized by a time duration of greater than 1 ns and includes more than one optical pulse. In an embodiment, gating the train of optical pulses includes passing the train of optical pulses through a fiber-coupled amplitude modulator. The fiber-coupled amplitude modulator may be at least one of a Mach- Zehnder modulator or an acousto-optic modulator. In a specific embodiment, the train of optical pulses is gated asynchronously with providing the train of optical pulses.

The method further includes amplifying the set of optical pulse packets to provide the set of amplified optical pulse packets having a second average power (414). Because the amplifier operates in a saturation mode, the second average power is substantially independent of the first average power. According to an embodiment of the present invention, the second average power varies by less than 1 dB for a change in the first average power by 3 dB. In a specific embodiment, amplifying the set of optical pulse packets includes preamplifying the set of optical pulse packets in a fiber preamplifier gain stage and amplifying the preamplified set of optical pulse packets in a fiber gain stage.

As illustrated by optional steps 416 and 418 in FIG. 4, the method may include compressing the optical pulses in the set of amplified optical pulse packets (416) and frequency converting the set of amplified optical pulse packets (418). Generally, when the optical pulses are compressed, the pulse duration between each of the optical pulses remains unchanged. Additionally, frequency conversion may include one of several processes, including second harmonic generation, sum frequency generation, or other frequency conversion processes. One of ordinary skill in the art would recognize many variations, modifications, and alternatives.

It should be appreciated that the specific steps illustrated in FIG. 4 provide a particular method of operating a hybrid mode-locked laser according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple substeps that may be performed in various sequences as appropriate to the individual step. Furthermore, additional steps may be added or removed depending on the particular applications. One of ordinary skill in the art would recognize many variations, modifications, and alternatives.

Figure 5:
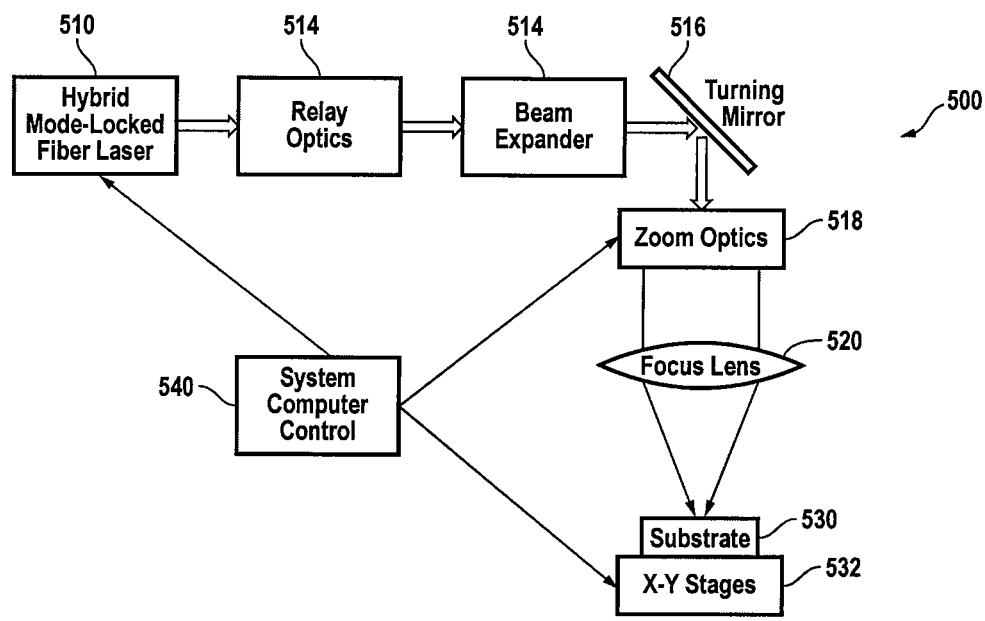
FIG. 5 is a simplified block diagram of a micro-machining system employing an embodiment of the present invention.

FIG. 5 is a simplified block diagram of a micro-machining system employing an embodiment of the present invention. As illustrated in FIG. 5, the micro-machining system 500 includes a hybrid mode-locked fiber laser 510. Hybrid mode-locked fiber lasers as described throughout the present specification are suitable for use in the micro-machining system. Relay optics 512 deliver the output of the hybrid mode-locked fiber laser 510 to a beam expander 514, which expands the beam dimension as a function of propagation distance. The turning mirror 516 directs the optical beam toward zoom optics 518 and focus lens 520. Although only two optical elements are illustrated as the zoom optics and the focus lens, one of skill in the art will appreciate that additional optical elements may be utilized depending on the particular optical design.

The laser light is focused onto a substrate or workpiece 530 that is supported on X-Y stages 532, which may also be referred to as a workpiece support. One or more elements of the micro-machining system 500 are under control of system computer control 540, which communicates in a one-way or two-way manner with the various system components. Embodiments of the present invention include SHG, 4HG, or 8HG wavelengths for micro-machining applications. The hybrid mode-locked fiber laser systems 510 in these embodiments may include a pulse compression element that shortens the pulse length of the pulses in an optical train. Additionally, the hybrid mode-locked fiber laser system 510 may include one or more nonlinear frequency conversion elements that provide an output at a predetermined wavelength (e.g., a frequency quadrupled wavelength of 266 nm) for these micro-machining applications.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An apparatus for producing coherent pulsed light with a fiber-based master oscillator/fiber amplifier architecture, the apparatus comprising:
    a fiber-coupled mode-locked laser source configured to provide pulses having a pulse duration of less than 1 ns;
    a fiber-coupled amplitude modulator optically coupled to the fiber-coupled mode-locked laser source, the fiber-coupled amplitude modulator configured for gate durations greater than 1 ns to deliver gated pulse packets having more than one pulse per pulse packet; and
    a fiber power amplifier optically coupled to the fiber-coupled amplitude modulator and configured for operating in a saturated mode from the pulse packets,
    wherein the fiber-coupled amplitude modulator comprises at least one of a Mach-Zehnder modulator or an acousto-optic modulator, each modulator configured to deliver gated pulse packets having more than one pulse per pulse packet.

2. The apparatus of claim 1 wherein a wavelength of operation of the fiber-coupled mode-locked laser source ranges from about 1015 nm to about 1085 nm.

3. The apparatus of claim 1 wherein the fiber-coupled mode-locked laser source comprises a rare earth doped active fiber.

4. The apparatus of claim 1 wherein the fiber power amplifier comprises:
    a preamplifier fiber gain stage optically coupled to the fiber-coupled amplitude modulator; and
    an amplifier fiber gain stage optically coupled to the preamplifier fiber gain stage.

5. The apparatus of claim 1 further comprising a pulse compressor optically coupled to the fiber power amplifier.

6. The apparatus of claim 1 further comprising one or more frequency conversion stages optically coupled to the fiber power amplifier.

7. The apparatus of claim 5 wherein the one or more frequency conversion stages comprises a nonlinear crystal.

8. An apparatus for producing coherent pulsed light with a fiber-based master oscillator/fiber amplifier architecture, the apparatus comprising:
    a fiber-coupled mode-locked laser source configured to provide pulses having a pulse duration of less than 1 ns and comprising a rare earth doped active fiber;
    a fiber-coupled amplitude modulator optically coupled to the fiber-coupled mode-locked laser source, the fiber-coupled amplitude modulator configured for gate durations greater than 1 ns to deliver gated pulse packets having more than one pulse per pulse packet; and
    a fiber power amplifier optically coupled to the fiber-coupled amplitude modulator and configured for operating in a saturated mode from the pulse packets.

9. The apparatus of claim 8 wherein a wavelength of operation of the fiber-coupled mode-locked laser source ranges from about 1015 nm to about 1085 nm.

10. The apparatus of claim 8 wherein the fiber-coupled amplitude modulator comprises at least one of a Mach-Zehnder modulator or an acousto-optic modulator, each modulator configured to deliver gated pulse packets having more than one pulse per pulse packet.

11. The apparatus of claim 8 wherein the fiber power amplifier comprises:
   a preamplifier fiber gain stage optically coupled to the fiber-coupled amplitude modulator; and
   an amplifier fiber gain stage optically coupled to the preamplifier fiber gain stage.

12. The apparatus of claim 8 further comprising a pulse compressor optically coupled to the fiber power amplifier.

13. The apparatus of claim 8 further comprising one or more frequency conversion stages optically coupled to the fiber power amplifier.

14. The apparatus of claim 13 wherein the one or more frequency conversion stages comprises a nonlinear crystal.

15. A method for producing coherent pulsed light with a fiber-based master oscillator/fiber amplifier architecture, the method comprising:
   providing electromagnetic radiation pulses having a pulse duration of less than 1 ns from a fiber-coupled mode-locked laser source;
   gating the electromagnetic radiation for a duration longer than 1 ns into gated pulse packets such that each pulse packet includes multiple electromagnetic radiation pulses; and
   saturating a fiber power amplifier with the pulse packets to produce a coherent laser beam from the fiber power amplifier,
   wherein the gating is performed by at least one of a Mach-Zehnder modulator or an acousto-optic modulator.

16. The method of claim 15 wherein a wavelength of the electromagnetic radiation pulses from the fiber-coupled mode-locked laser source ranges from about 1015 nm to about 1085 nm.

17. The method of claim 15 further comprising:
   preamplifying the pulse packets in a fiber preamplifier gain stage; and
   amplifying the preamplified pulse packets in an amplifier fiber gain stage.

18. The method of claim 15 further comprising:
   compressing peaks in the coherent laser beam from the fiber power amplifier.

19. The method of claim 15 further comprising:
   converting a frequency of peaks in the coherent laser beam from the fiber power amplifier.

* * * * *